Oct. 8, 1968  D. J. LAHEY  3,404,913
BOAT CARRIER FOR CAMPING TRAILERS
Filed May 9, 1966  2 Sheets-Sheet 1

INVENTOR.
DAVID J. LAHEY
BY
Ub. P. Carr
ATTORNEY

Oct. 8, 1968   D. J. LAHEY   3,404,913
BOAT CARRIER FOR CAMPING TRAILERS
Filed May 9, 1966   2 Sheets-Sheet 2
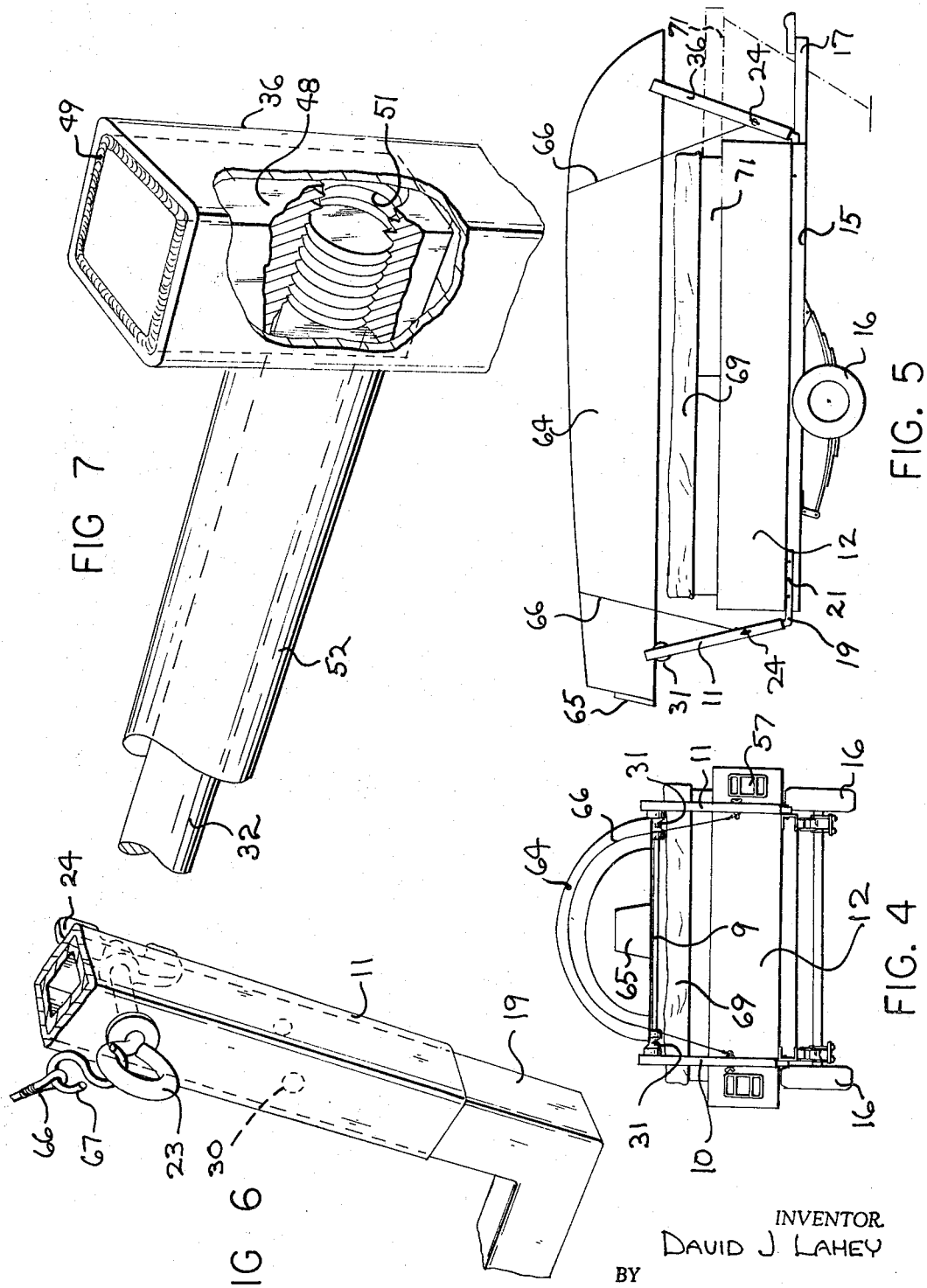
INVENTOR
DAVID J. LAHEY
BY
W. P. Carr
ATTORNEY

United States Patent Office 3,404,913
Patented Oct. 8, 1968

3,404,913
BOAT CARRIER FOR CAMPING TRAILERS
David J. Lahey, R.F.D. Rte. 2, Tracey Road,
Perrysburg, Ohio 43551
Filed May 9, 1966, Ser. No. 548,520
4 Claims. (Cl. 296—23)

ABSTRACT OF THE DISCLOSURE

A camping trailer boat carrier comprising bumper element brackets secured to the trailer frame, four hollow upstanding corner posts telescopically mounted on the respective brackets and a pair of cross bars mounted on the posts for supporting a boat.

---

This invention relates to a boat carrier adapted for mounting upon a camping trailer of the type including a collapsible tent-like enclosure which is folded in stored position when the trailer is hitched to a passenger vehicle for hauling to a camping site.

The boat carrier of this invention is more particularly designed for camping trailers with slide out beds extending from the ends of the trailer body when the camping tent is erected for occupancy.

The primary object of the invention is to provide a boat carrier that is easy to install and does not interfere with the erection of the camping equipment.

A further object of the invention is the provision of a boat carrier which supports the boat on the frame of the trailer and holds the boat above the folded camping tent, whereby the latter is not crushed, torn, or marred.

Another object of the invention is the provision of a boat carrier which is sturdy in construction and inexpensive in design.

A still further object is a carrier which permits easy loading and unloading of the boat.

An additional object is a carrier that may be readily assembled or dismantled, that occupies but a small space, that is substantially built and that requires but little attention in use. A supplemental object of the invention is a boat carrier which has sturdy portions extending in protecting position beyond the rear of the body of the trailer to serve as a guarding bumper therefor. With the foregoing and other objects in view the invention consists in the combination and arrangement of parts to be hereinafter fully described, defined in the claims and illustrated in the accompanying drawings forming part of this disclosure.

More specifically the objects of the invention and the advantages thereof are attained by having base brackets of the carrier bolted rigidly and permanently to the frame of the camping trailer with portions of the brackets extending upwardly and preferably slightly angularly away from the ends of the trailer; by having easily removable square upper posts telescopically mounted upon the upwardly projecting portions of the brackets; by having horizontal bars extending between the upright posts; by having rubber boat contacting elements on the bars; by having easily removed eye bolts holding the upright posts on the brackets; by utilizing the eye bolts for fastening the ends of elastic retaining ropes drawn over the boat; by utilizing other supplemental elements; and by modified forms of the invention as hereinafter described.

Referring to the drawings, FIGURE 1 is a perspective view of the frame of a camping trailer, for which the boat carrier is adapted, with the base brackets of the carrier shown fixed to the frame and with the upper posts and cross bars thereof assembled and in position for lowering upon the base brackets;

FIGURE 4 is a rear end view of a camping trailer with the boat carrier mounted thereon and a boat in place upon the carrier;

FIGURE 5 is a side elevation of the trailer, carrier and boat of FIGURE 4;

FIGURE 6 is an enlarged perspective view with parts broken away showing the lower end of an upright post telescoped over and secured upon the upwardly extending portion of a base bracket; and FIGURE 7 is an enlarged fragmentary, perspective view of the upper end of a carrier post located at the front end of the trailer and showing the connection thereof to a cross bar.

Figure 1:
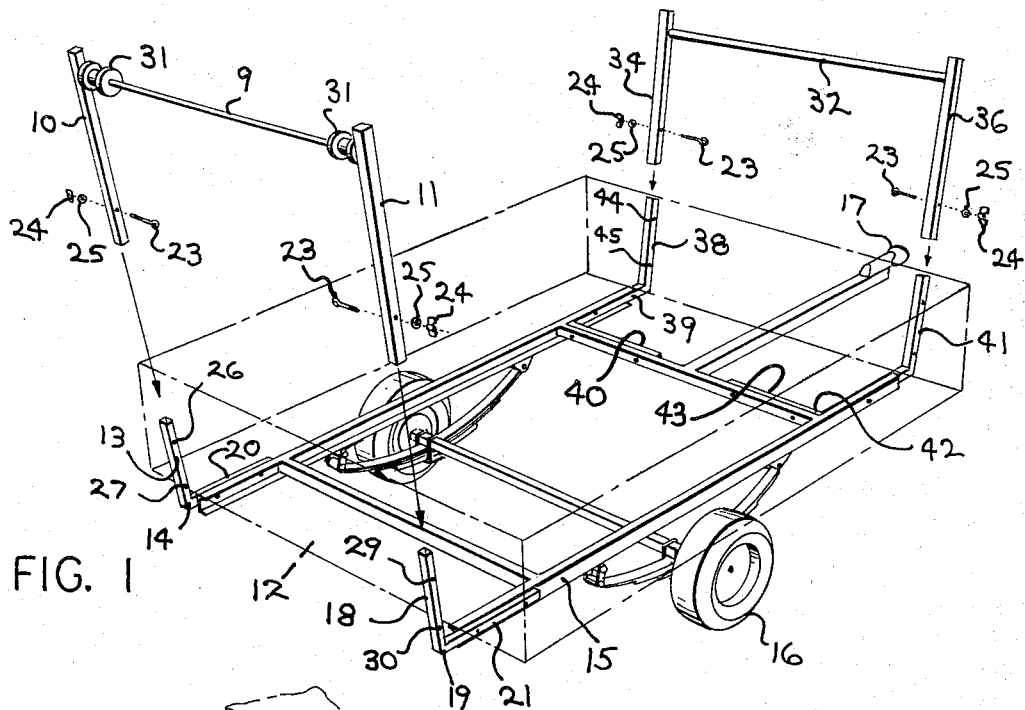

Referring to the drawings in more detail and initially to the showing of FIGURE 1, the cross bar 9 of the carrier extends horizontally across and above the rear end of the trailer. This bar is fixed at its ends to the square posts 10 and 11.

These posts extend down adjacent the trailer body 12, the latter being indicated by dotted lines. At the left of the rear end of the trailer is the bracket 14 with an uprigh portion 13 for receiving post 10.

The trailer frame 15 is supported through springs and an axle upon wheels 16. A tongue 17 by which the trailer is drawn by an automobile or other vehicle extends from the forward end of the frame.

The upright portion 18 of bracket 19 is positioned at the right rear end of the trailer for receiving the corner post 11. The angled brackets 14 and 19 have respectively lower horizontal legs 20 and 21 which are fastened by bolts to the outer or back sides of inwardly facing channels forming longitudinal side rails of the frame.

Through eye bolt 23 with its associated wing nut 24 and washer 25 post 10 is secured over the upright portion 13 of bracket 14. The eye bolt 23 passes through post 10 and either of holes 26 or 27 of the bracket depending upon the height required for spacing the boat above the trailer. Similarly the corner post 11 is held upon the upright portion 18 of the bracket 19 with a like eye bolt 23 passing through either hole 29 or 30 of the bracket.

For ease of placing the boat on the carrier and to avoid marring the boat, rubber rollers 31 are slidably mounted on the cross bar 9. These rollers are adapted to receive the gunwales of the boat and to spread apart or draw closer together as the distance across the boat between the gunwales varies.

The bow of the boat is pushed over and rests upon the cross bar 32 at the front end of the trailer. The ends of this carrier bar is attached to square posts 34 and 36. These posts are respectively telescoped over the upright portions 38 and 41 of the double angled brackets 39 and 42. Either hole 44 or 45 in the upright portion 30 of bracket 39 and the corresponding hole in bracket 42 receive eye bolts 23 and provide a choice of height for the carrier.

The horizontal L-shaped leg 40 of bracket 39 is bolted to the trailer frame within the inner face of the channel forming the right hand longitudinal side rail of the frame and against the transverse brace near the forward end of the frame. The L-shaped leg 40 thus conforms with the angle between the side rail and transverse brace.

Similarly the lower L-shaped leg 43 of bracket 42 is fitted against and bolted within the other side rail and against the transverse brace of the frame.

The type of the threaded connection between cross bars 9 and 32 and the posts supporting the bars is illustrated in FIGURE 7, with bar 32 and post 36 specifically shown. A close fitting square plug 48, four inches long, pretapped as indicated at 51, three inches from the top, is inserted within post 36. The outer ends of the plug and post are substantially flush. An anchoring weld 49 is laid along the edge of the plug within a groove formed by a corner bevel.

The bar 32, which is a solid round rod with a diameter of three quarters of an inch, has a firm attachment to the post 36 and the integrated plug 48 through a threaded engagement at least three quarters of an inch in length. Before attachment of the bar 32 to the posts, a rubber or soft plastic boat protecting sleeve 52 is slipped over the bar.

Figure 2:
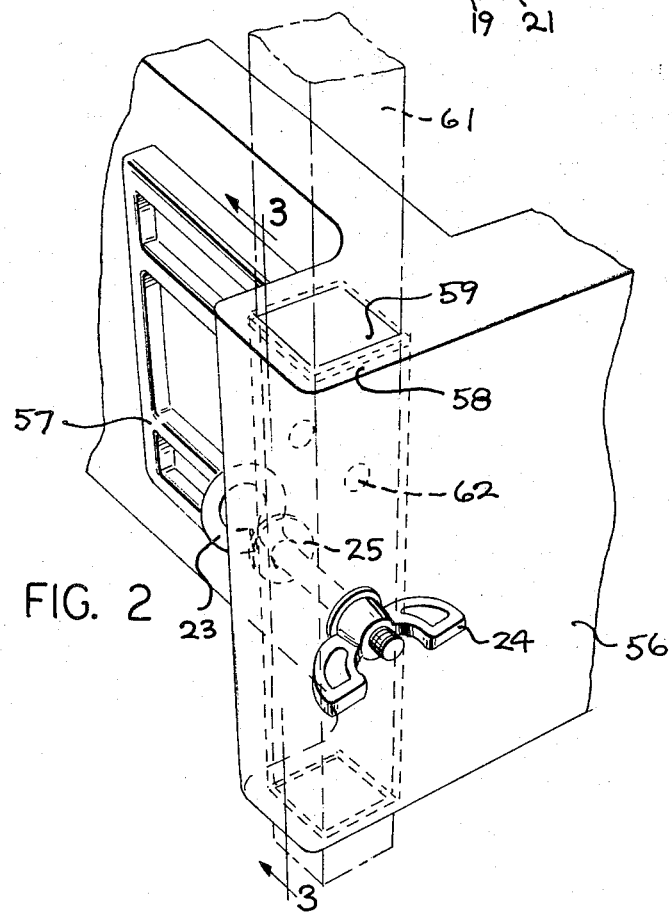
FIGURE 2 is a perspective view of a fragmentary corner of a body of a camping trailer designed for directly receiving an upright post of the boat carrier of this invention.
Figure 3:
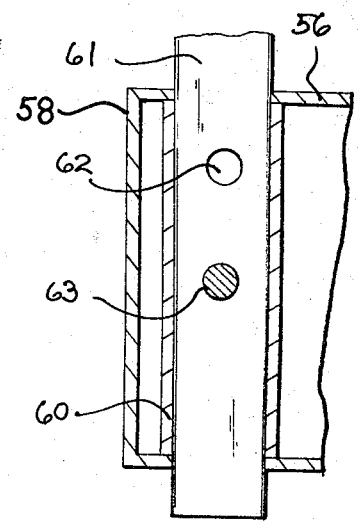
FIGURE 3 is a partial vertical section of the corner of the trailer body shown in FIGURE 2.

Instead of having brackets fastened to the frame of the trailer for receiving the upright carrier posts 10, 11, 34 and 36, sockets or open end channels for reception of the posts may be incorporated in the corner structure of the trailer body. Such an alternate form of the invention is depicted in FIGURES 2 and 3. The trailer body 56 there illustrated has a corner projection 58 located at the rear right end of the body adjacent the rear light 57. An open end square vertical channel extends through the projection 58. In this instance a square insert 60 is welded within the hollow projection to provide a casing for the channel. The corner post 61 of the boat carrier is received within the channel and its elevation determined by passing the eye bolt 23 through either transverse hole 62 and 63, but is here illustrated as being inserted through hole 63.

In FIGURES 4 and 5 a boat 64 having a rear motor base plate 65 is shown mounted upon a trailer ready to be transported with the trailer and the camping tent 69 packed thereon. Elastic ropes 66 stretch over the boat to hold it in place. These are fastened through S links 67 to the heads of eye bolts 23 as may be seen in FIGURE 6.

Upon arrival at a camping site the boat 64 is unloaded and the corner posts of the carrier removed. The cover of the camping tent 69 is then removed and the tent is erected. With the conventional design of tent there are bed sections 71 which are slid outwardly from the ends of the trailer. The outer position of one of the beds 71 is indicated in dotted lines in FIGURE 5. By removal of the posts space for the extended bed sections is provided since the upper portions of the brackets are below the extended bed sections and do not interfere therewith.

In the preferred embodiment of the invention shown in FIGURES 1, 4, 5, 6 and 7 of the drawings the camping trailer is approximately eight feet long and six and one-half feet wide when the camping tent is in compacted position for traveling. The rigid body of the trailer and the folded tent equipment rising above the level of the rigid body have a combined height above the trailer frame of approximately two feet.

As a primary purpose of the invention is to provide a support for the boating holding it in spaced relation above the packed camping equipment, the carrier brackets and the carrier posts must extend high enough to place the boat receiving cross bars of the carrier several inches above the camping equipment, which in this example would be about two and one quarter feet above the trailer frame. In order to provide this height of the cross bars the rear brackets 14 and 19 have upright portions 13 and 18 which are fourteen inches long and the rear vertical corner posts 10 and 11 which telescope over the upright portions 13 and 18 are thirty inches long. The brackets 14 and 19 are constructed of one inch square steel tubing with a wall thickness of approximately three thirty seconds of an inch while the posts 10 and 11 are similar square tubing with a diameter of one and one quarter inches.

With the eye bolts 23 thrust through the lower holes in the upright portions 13 and 18 the lower ends of the posts are roughly two inches above the lower ends of the upright portions. The lengths of the corresponding brackets and posts of the carrier at the front of the trailer are slightly greater to compensate for the few inches of lower level at which the front bracket are attached to the frame.

In order to space the cross bars 9 and 32 further apart so that they may receive boats of greater length the upper portions of the carrier brackets are angled outwardly from the ends of the trailer about ten degrees from a straight vertical position. The posts being aligned with the brackets through their telescopic engagement therewith are correspondingly angled. Boats between ten and fourteen feet may thus be supported upon the carrier.

Of at least equal importance in the functioning of the carrier, the angled positioning of the posts provides a slight spring action in the support of the boat, and the lateral stress of the load against the posts minimizes any tendency toward vibration from road shocks.

The solid construction of the carrier gives it ample strength to support the boat and also presents a strong guarding barrier for the trailer body against damage by collision.

While square steel tubing is preferred for the brackets and posts, rectangular stock would serve quite satisfactorily. However, it would likely be more costly in the first place and more expensive to fabricate. Another obvious but rather inferior substitution would be U-shaped channel iron in place of the square tubing for the brackets.

Modifications and variations such as those above mentioned may occur to those skilled in the art without departing from the scope of the invention as herein disclosed and subsequently claimed.

In conclusion it may be observed that the objects of the invention to provide an effective, inexpensive, easily mounted, and reliable boat carrier for camping trailers have been fully satisfied by the carrier embodying the invention as herein disclosed.

What I claim is:

1. A boat carrier for and in combination with a camping trailer including a pair of cross bars for supporting the ends of an upturned boat, four corner hollow posts to which the cross bars are joined at a height above the top level of the camping trailer, a trailer frame, a trailer body mounted on the frame, means fastened to the frame adjacent the corners of the body and independent of the body on which the posts are telescopingly mounted, said means projecting sufficiently from the ends of the body and spaced substantially from the body to serve as bumper elements.

2. A boat carrier according to claim 1, in which the posts are inclined outwardly from the ends of the trailer body.

3. A boat carrier according to claim 1 in which the means adjacent the corners of the body are brackets fastened directly to the frame of the trailer with portions of the brackets extending upwardly for telescopic receipt of the lower ends of the hollow posts, said portions of the brackets having a smaller diameter than and fitting within the hollow posts.

4. A boat carrier according to claim 1 in which there are eye bolts joining the posts to the means on which the posts are mounted and there are retaining ropes for extending over a boat placed on the carrier with the ends of the ropes secured to the eye portions of the bolts.

References Cited

UNITED STATES PATENTS

| | | | |
|---|---|---|---|
| 3,026,981 | 3/1962 | Youtie | 280—414 X |
| 2,570,802 | 10/1951 | Hatteburg | 296—3 X |
| 2,216,553 | 10/1940 | Greene | 280—414 X |
| 1,991,397 | 2/1935 | Lampman | 296—3 X |
| 498,553 | 5/1893 | Jennings | 296—3 X |
| 1,727,461 | 9/1929 | Bartlett | 296—43 |

PHILIP GOODMAN, *Primary Examiner.*

BENJAMIN HERSH, *Examiner.*